United States Patent [19]

Enger et al.

[11] 3,800,293

[45] Mar. 26, 1974

[54] MICROPROGRAM CONTROL SUBSYSTEM

[75] Inventors: Thomas A. Enger, Wappingers Falls; Charles W. Evans, Jr.; Lance H. Johnson, both of Poughkeepsie, all of N.Y.

[73] Assignee: International Business Machines Corporation, Armonk, N.Y.

[22] Filed: Dec. 26, 1972

[21] Appl. No.: 317,961

[52] U.S. Cl. .............................................. 340/172.5
[51] Int. Cl..... G06f 9/16, G05b 19/22, G06f 13/06
[58] Field of Search .................................. 340/172.5

[56] References Cited

UNITED STATES PATENTS

| | | | |
|---|---|---|---|
| 3,656,123 | 4/1972 | Carnevele et al. | 340/172.5 |
| 3,609,700 | 9/1971 | Wollum et al. | 340/172.5 |
| 3,623,158 | 11/1971 | Llewelyn et al. | 340/172.5 |
| 3,634,883 | 1/1972 | Kreidermacher | 340/172.5 |
| 3,689,895 | 9/1972 | Kitamura | 340/172.5 |
| 3,704,448 | 11/1972 | Osborne | 340/172.5 |
| 3,713,108 | 1/1973 | Edstrom et al. | 340/172.5 |

*Primary Examiner*—Gareth D. Shaw
*Assistant Examiner*—Jan E. Rhoads
*Attorney, Agent, or Firm*—R. W. Berray

[57] ABSTRACT

A microprogram control subsystem discloses two control stores, one of which is accessed and utilized only on the first cycle of a microprogram sequence utilized to execute an information handling system instruction. A portion of the operation code of the system instruction is used to address the first-cycle control store to provide access to a microinstruction having fewer binary bits than normal microinstructions, and is effective to direct access to the remainder of the microprogram sequence contained in the other control store.

4 Claims, 1 Drawing Figure

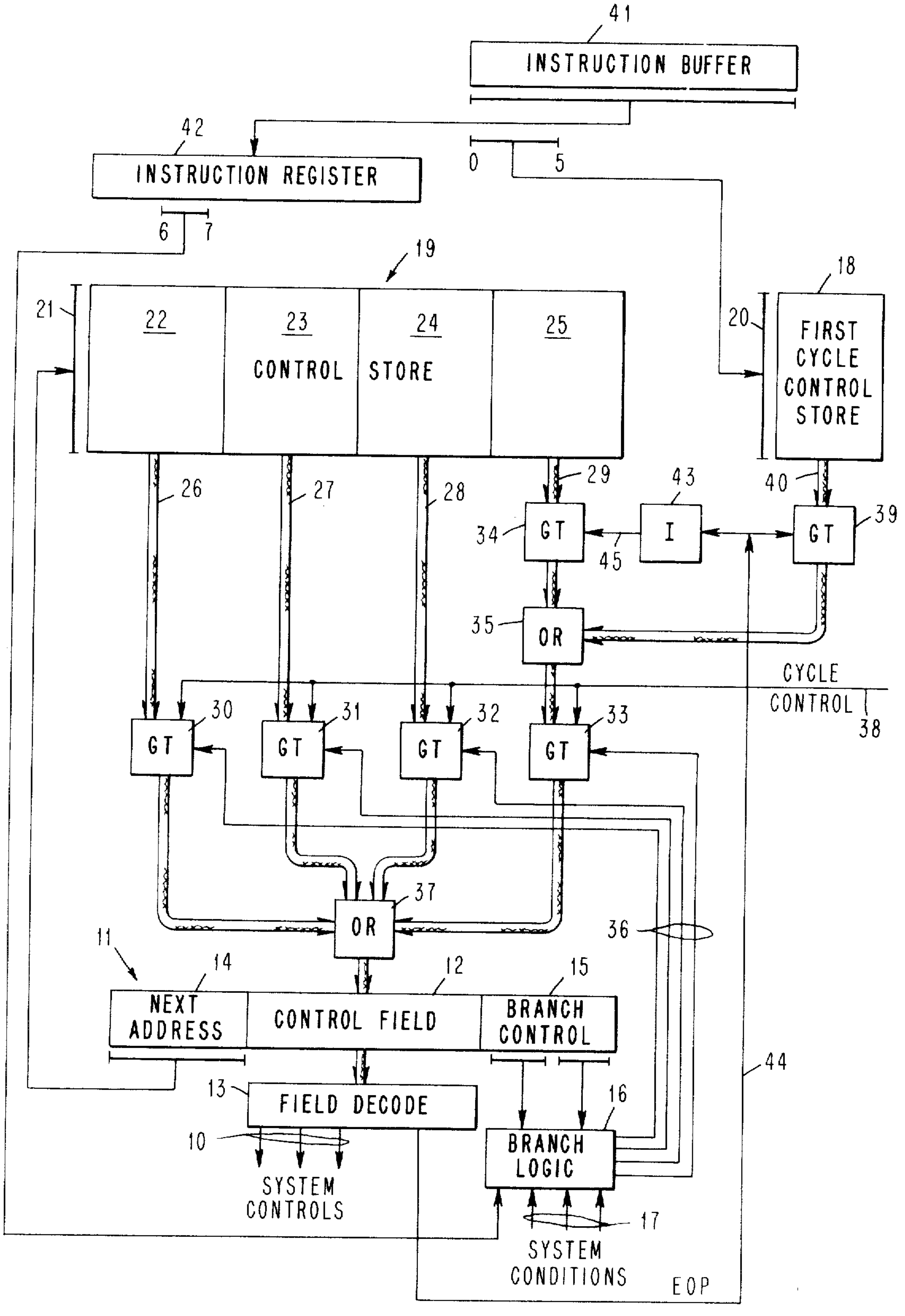
41
INSTRUCTION BUFFER
0
5
42
INSTRUCTION REGISTER
6
7
19
18
21
20
22
23
24
25
CONTROL STORE
FIRST CYCLE CONTROL STORE
26
27
28
29
40
43
34
GT
I
GT
39
45
35
OR
CYCLE CONTROL
38
30
31
32
33
GT
GT
GT
GT
37
OR
36
11
14
12
15
NEXT ADDRESS
CONTROL FIELD
BRANCH CONTROL
44
13
FIELD DECODE
16
10
BRANCH LOGIC
SYSTEM CONTROLS
17
SYSTEM CONDITIONS
EOP

MICROPROGRAM CONTROL SUBSYSTEM

BACKGROUND OF THE INVENTION

This invention relates to control stores for controlling the sequence of elementary operations within an information handling system, and more particularly, the invention relates to a microprogrammed control store subsystem which is of reduced physical size and provides concurrent operations.

A substantial percentage of all computers built in recent years have utilized microprogrammed control units to control the operations performed by a central processing unit (CPU) during the execution of an instruction. Under control of the microprogrammed control unit, the instruction is executed by the performance of a sequence of elementary operations, each of which occurs during a single CPU cycle. During each of these cycles, elementary operations are performed under the control of a microinstruction which has been accessed from the control unit. Generally, within a single CPU cycle, more than one elementary operation is performed (in parallel and/or in sequence within the cycle). Each elementary operation is performed under control of a "micro-order." A microinstruction thus contains a plurality of micro-orders, each of which is performed during one CPU cycle. A sequence of microinstructions which execute a given function (for example, a software instruction) make up a microprogram or micro routine.

In most microprogrammed systems, microinstruction sequencing is achieved by allocating a portion of each microinstruction for indicating the address of the next microinstruction to be performed. The next address portion is fed, along with branching controls, to the address register of the control storage in order to select the next microinstruction to be performed. In such a system, if a given microinstruction is used in several different micro routines, the instruction will be stored at several different places within a microprogram control storage. This replication is one factor which tends to increase the size of the control unit.

Another factor which affects the size of the control unit is micro-order density. Within each microinstruction, various fields are allocated to specific types or classes of micro-orders. If, within a given microinstruction, one or more of the microorder classes is not utilized, then the field or fields allocated thereto will contain no information that is of substantial use to the system. The presence in the microprogram storage of fields which, in effect, contain no information of value to the system also tend to increase the size of the control unit.

A particular instance of decreased efficiency in a control store subsystem in connection with the above cited aspects concerning addressing and branching, is realized when a new sequence of microinstructions, must be initiated in response to a new system instruction. During the execution of a particular system instruction, a number of conditions may have to be fullfilled before execution of the next system instruction can be initiated. At the conclusion of a microprogram, a particular microinstruction must be decoded to indicate that the execution of the present system instruction is completed before the operation code of the next instruction can be examined and used to control the start of the next microinstruction sequence. This requires one complete system cycle to make this determination and the particular microinstruction indicating the end of the operation (EOP) does very little additional effective work.

In addition to effectively losing a machine cycle for the purpose of deteriming whether or not an operation has been completed on a particular system instruction, additional inefficiency is realized at the time the operation code of the next instruction to be executed is analyzed. In prior systems, at least a portion of the operation code (OP CODE) is utilized to form the address of the first microinstruction of the sequence required to perform the system instruction. When utilizing this technique, a number of binary bit positions must be set aside in each microinstruction to only be effective for analyzing the OP CODE to provide the ability to perform a 64-way branch. These binary bit positions in all other microinstructions are, in effect, wasted.

A general discussion relating to the method of implementing a microprogram control storage can be found in an article entitled "Microprogram Control For System/360" by S. G. Tucker, found in the IBM Systems Journal, Vol. 6, No. 4, 1967, pages 222–241. This article is herewith incorporated by this reference for its showing of method of control store addressing, division of microinstructions into various fields, and method of decoding and branch decision making. Also incorporated by reference herein for their showing of various techniques of branch decoding are U. S. Pat. No. 3,325,785, issued June 13, 1967, entitled "Efficient Utilization Of Control Storage And Access Controls Therefor," by W. Y. Stevens and U. S. Pat. No. 3,391,392, issued July 2, 1968, entitled "Microprogram Control For A Data Processing System" by G. H. Ottaway et al., both of which are assigned to the assignee of the present invention.

SUMMARY OF THE INVENTION

It is a primary object, feature, and advantage of the present invention to provide a microprogram control subsystem wherein access to the first microinstruction of a system instruction execution can be overlapped and made concurrent with the execution of the last microinstruction of a system instruction execution. Further, the number of binary bits in all microinstructions can be reduced by eliminating the requirement for a complete range of branch possibilities based on decoding of the OP CODE of a system instruction.

The micoprogram control subsystem of the present invention is comprised of first and second microinstruction control stores. A portion of the OP CODE of a system instruction to be executed is utilized to address a first of the control stores to obtain therefrom a microinstruction. The other microinstruction control store is comprised of a plurality of control store modules which are all accessed simultaneously utilizing next address information in each microinstruction registered and manifested by a microinstruction control register. On each machine cycle, the plurality of control store modules are accessed at the address indicated in the control register such that, at or near the completion of a machine cycle, branch conditions based on system operations will have been determined to enable, or select, a gate at the output of a particular one of the control store modules for entry of the next following microinstruction in the control register. Upon detection of a particular microinstruction in the control register, namely a microinstruction which indicates either an absolute last cycle of execution or a conditional last cycle of execution, the OP CODE of the next system instruction to be executed will be utilized to access the first control store. At the completion of the last system cycle of the previous system instruction, a gate will be selected at the output of the first control store for entry of the first microinstruction into the control register from the first control store.

The fact that the particular microinstruction indicating EOP may be conditional relates to certain system instructions such as floating point operations, where the shifting of the result for normalizing may be required at the completion of the arithmetic operation. That is, the particular microinstruction indicating EOP is conditional such that when the result is examined and a branch decision made, either a particular gate from the second control store will be enabled to initiate a normalizing sequence of microinstructions, or if normalizing is not required, the gate will be enabled at the output of the first control store to immediately initiate execution of the following system instruction.

Since the first microinstruction of any system instruction execution has very limited functions to perform, its size may be substantially reduced from the size of microinstructions obtained from the second control store. The primary function of the first microinstruction from the first control store is to provide a next address indication for obtaining the second and all following microinstructions for the system instruction execution. Since only a portion of the OP CODE was utilized to access the first control store for the first microinstruction, the remaining binary bits of the OP CODE are utilized in the branch decision logic to select one of the gates at the output of one of the plurality of control store modules for selection of the proper microinstruction utilized on the second cycle of execution.

DESCRIPTION OF THE DRAWING

The single FIGURE shows, in block diagram form, the microprogram control subsystem implemented in accordance with the present invention.

DETAILED DESCRIPTION OF THE INVENTION

The basic function of stored microprogram control of an information handling system is to generate system control signals 10 for operating the various data paths within the system. On each machine cycle, a microinstruction will be registered in a control register 11 to be decoded and effect various system controls on lines 10. The microinstructions inserted in the control register 11 will have various binary data fields including various control fields 12 which are presented to a field decode mechanism 13 to determine the particular actions to take place during that machine cycle. In accordance with the teachings of the above cited Tucker reference, each microinstruction will also include a number of binary bits 14 specifying the next address to be used for obtaining the next microinstruction. Also, another field of each microinstruction will include a number of binary bits 15 exercising branch control over the entire system. As distinguished from the showing of the preferred embodiment of this invention, the above cited Tucker reference discusses the manner in which the next address bits 14 would be modified, or changed in accordance with branch logic 16 responding to system conditions on lines 17. That is, prior to initiating access to a storage device using the next address bits 14, the branch conditions must be determined and added to the address bits 14 before access to the mcroinstruction store can be initiated to obtain the next microinstruction or further execution.

In accordance with the preferred embodiment of the present invention, the storage of microinstructions is split between a first control store 18 identified as a first cycle control store, and a second control store 19. Each of the control stores 18 and 19 include, as more fully described in the above cited article, an address mechanism shown schematically at 20 and 21 respectively. The address mechanism is utilized to accept binary information which is decoded to provide access to a microinstruction.

Further, in accordance with the preferred embodiment of the present invention, the control store 19 is comprised of a plurality of control store modules 22 23, 24, and 25. In response to binary address bits from field 14 of each microinstruction transferred to the address mechanism 21, each of the control store modules will read out a microinstruction on cables 26, 27, 28, and 29 to corresponding gate elements 30, 31, 32, and 33. The path of a microinstruction from control store module 25 to gate element 33 includes a gate 34 and OR circuit 35, the functions of which will be discussed subsequently. In normal sequencing of control store 19, gate 34 will be enabled.

During normal sequencing of microinstructions to the control register 11, during the execution of a system instruction, the address bits 14 will initiate access to the control store 19 to present four separate microinstructions to gates 30–33. It is the function of the previously mentioned branch control 15, branch logic 16, and system conditions 17, to resolve the various branch conditions to thereby enable or select one of the gates 30-33 by means of a signal on one of the gate signal lines 36. Depending on which of the lines 36 is energized, the microinstruction for the next machine cycle will be obtained from one of the gate elements 30–33 through an OR circuit 37, which in the case of gate element 33 also requires passage through the OR circuit 35 and gate 34. A desirable feature of the preferred embodiment of the present invention, as contrasted with the above cited article, is now apparent.

Whereas in prior systems, access to a control store 19 could only be made at the time branch conditions had been determined, immediate access is effected using the next address bits 14 for one of four possible subsequent microinstructions. While the address is being decoded in the address mechanism 21 and various drive lines energized for obtaining access to microinstructions in the control store, control fields 12 will be decoded in the decoder 13 and system control signals generated on lines 10 to effect the transfer of data within the system. The operation of the system controls 10 generate various system conditions on signal lines 17 which must be examined in accordance with the branch logic 16. Therefore, at the time the four microinstructions are available at gate elements 30–33, the branch conditions will have been determined and a proper selection made for the next subsequent microinstruction. The basic cycle time for each system cycle, or cycle of the microprogram control subsystem, will be determined by cycle time pulses on a line 38 which is the final enabling input to the gate elements 30–33.

In addition to providing a plurality of control storage modules 22–25 to achieve faster cycle time as it relates to branch control decisions, an additional desirable feature is provided by the use of a first cycle control store 18. The first cycle control store 18 will be effective to transfer a microinstruction through a gate 39, OR circuit 35, and OR circuit 37, to the control register 11 only on the first microinstruction cycle of a microprogram sequence for each system instruction to be executed. Access to the microinstruction in the first cycle control store 18 will be effected and presented to gate circuit 39 on a cable 40 concurrent with execution of the final control subsystem cycle of a previous system instruction. Therefore, at the time the next following machine cycle is initiated on the cycle control line 38, gate 39 will provide the microinstruction required in the control register 11.

In the information handling system utilizing the control subsystem of the present invention, there will be at least two registers 41 and 42 which will store at least two sequential information handling system instructions. During the sequence of microinstructions from control store 19 for executing a system instruction, the instruction being executed will be registered in the instruction register 42. At some point in time, register 41, labeled Instruction Buffer will register the system instruction which is to be executed next in the sequence of the system program.

As in previous microprogram control systems, the OP CODE of a system instruction to be executed will be utilized to determine the starting point of a microinstruction sequence to perform the execution. In the preferred embodiment of the present invention, the first six binary bits of the OP CODE of each system instruction will be transferred to the address mechanism 20 of the first cycle control store 18. With six binary bits used as address information, the first cycle control store will have only 64 addressable locations or microinstructions. An OP CODE may have eight binary bits to be decoded to indicate the operation to be performed by a system instruction. Therefore, the 256 possible OP CODE combinations are effectively divided into 64 groups of four OP CODES, each of the 64 groups being associated with one of the 64 microinstructions in the first cycle control store 18. The remaining two binary bits, that is bits 6 and 7 of the OP CODE, will be transferred from register 42 to the branch logic 16. There two bits further identify which of the four OP CODES within the particular group is to be executed, to thereby enable one of the control lines 36 to select from control store modules 22–25 the second microinstruction to be executed in the sequence.

The only remaining logic of the figure to be identified is an Inverter 43. It is a basic function of the present invention to initiate access to the first cycle control store 18 concurrently with access to the control store 19. On the next machine cycle defined by the cycle control 38, following the final cycle of execution of the system instruction in register 42, the microinstruction transferred to the control register 11 will be the one required to initiate execution of the system instruction then residing in the instruction buffer 41. In its basic form, the final microinstruction in control register 11 for any of the microinstruction sequences will have a control field which is decoded by decoder 13 indicating, on a signal line 44, that this microinstruction represents the end of the operation (EOP) for this system instruction execution sequence. Therefore, during the execution of this final microinstruction the gate circuit 39 will be enabled and gate element 34 disabled through operation of the output 45 from Inverter 43 to transfer the first cycle microinstruction through OR circuit 35 to gate element 33. On the unconditional last cycle of execution, the branch logic 16 will energize the control line 36 to gate element 33 such that when cycle control signal 38 is generated, gate element 33 will enter the first microinstruction into control register 11.

In a preferred embodiment of the present invention, the Inverter 43 is provided to normally select, on signal line 45, the gate circuit 34 indicating that the cycle control pulse on line 38 is to present the output of control store module 25 to gate element 33 for selection by one of control lines 36 based on branch logic 16. For some microinstruction sequences, such as in the previously discussed execution of a floating point operation, the execution of a particular microinstruction may or may not be the final cycle of execution. Therefore, there are particular microinstructions contained in the control register 11 which effectively provide a conditional indication of the last cycle of operation. For example, in a floating point arithmetic operation, there may be a requirement to normalize the floating point number at the completion of the arithmetic operation being performed. That is, any binary 0's in the highest order positions of the fraction of a floating point number must be removed and therefore the fraction number must be shifted a certain number of positions before the system instruction has been fully completed. In this case, the branch control 15 of the EOP microinstruction will determine, on the last cycle of the arithmetic operation whether or not leading 0's are present. This EOP microinstruction will have a next address field 14 specifying a set of four microinstructions, one of which will be the proper microinstruction to be executed for the purpose of initiating the normalizing procedure. The need for normalizing will be indicated on one of the control signal lines 36 to select a particular one of the gate elements 30, 31, or 32. Gate element 33 will not be selected, and therefore, the previously accessed first cycle microinstruction gated from gate 39 will not be entered in control register 11.

In the situation where the final arithmetic step has been performed by a microinstruction indicating EOP, and the branch logic 16 determines that normalization is not required, the fact that there is no branch to be taken will be signalled on the control line 36 which selects gate element 33. Therefore, the combined operation of the decoder 13 signifying EOP, the branch logic 16, and the Inverter 43, will be effective to select either the gate 39 associated with the first cycle control store 18, or the gating means of the control store 19 as represented by the gate elements 30–33 and 34. The operation of the next address bits 14 in control register 11 applied to the address mechanism 21 of control store 19, and the application of a portion of the OP CODE bits of the next following system instruction to the address mechanism 20 of the first cycle control store 18 provides simultaneous access to microinstructions in control store 19 for use in further conditional sequencing required for an instruction in register 42 or the provision of the first microinstruction in the control register 11 for initiating execution of the next subsequent instruction in register 41.

Whereas normally, each miroinstruction obtained from control store 19 might be comprised of approximately 100 binary bits to effect all of the necessary controls for instruction execution, each microinstruction obtained from the first cycle control store 18 need only provide a number of binary bits to be inserted in the next address field 14 of the control register 11. This might typically be ten binary bits. In addition, certain very basic and simple first cycle functions may need to be designated by bits in the control field 12, and at least enough branch control 15 information to perform a four-way branch based on the remaining OP CODE bits in the instruction register 41. Therefore, not only are there substantially fewer addressable locations in the first control store 18, each microinstruction requires substantially fewer binary bit positions to effect a first cycle control by the control subsystem. Further, the present invention eliminates the need to provide a number of binary bits in branch control 15 of each microinstruction location in control store 19 to effect a 64-way branch in accordance with bits 0–5 of an OP CODE. Bit positions in each microinstruction location to contain this information, used only on the last microinstruction of the sequence, need not be provided, therefore reducing the number of total bit positions in the basic control store 19.

The basic logic of implementing the present invention has been shown in the drawing. Actual construction may take many forms depending on circuit technology. For example, the OR circuits 35 and 37 can be constructed by merely physically connecting the signal lines together. Further, the gate elements 30–33 and the wired OR 37 may be distributed and structured in association with each binary bit position of control register 11. That is, each bit position of register 11 would include a latch for registering the binary bit and its associated portion of gates 30–33, the outputs of which are connected together to form OR circuit 37.

There has thus been shown, in the preferred embodiment of the present invention, a microprogram control subsystem in which the total number of bit positions which must be provided for the storage of microinstructions in the subsystem is substantially reduced. Further, no machine cycles are lost in effecting a change from executing the last microinstruction of a system instruction and the access of the first microinstruction to be utilized in a subsequent system instruction execution.

What is claimed is:

1. A cyclically operable microprogram control subsystem for an information handling system for controlling system operations in response to system conditions and system instructions including at least a plural binary bit operation code comprising:

a first control store for microinstructions;

a second control store for microinstructions;

each said first and second control stores including addressing means and gating means for providing access to system controlling microinstructions;

control register means connected to said gating means of said first control store and said second control store for receiving and manifesting microinstructions for each of plural control subsystem cycles of operation; and selection means, connected and responsive to microinstructions manifested by said control register means, including first enabling means connected to said gating means of said first control store and second enabling means connected to said gating means of said second control store, said first control store enabling means including last cycle signal means for indicating the last control subsystem cycle of a system instruction execution.

2. A microprogram control subsystem in accordance with claim 1 further including:

operation code register means; and first interconnecting means from said operation code register means to said addressing means of said first control store whereby the first microinstruction manifested by said control register means for each system instruction execution is accessed from said first control store in accordance with the system instruction operation code.

3. A microprogram control subsystem in accordance with claim 2 including:

second interconnecting means for transferring manifestations of a next address from each microinstruction in said control register to said addressing means of said second control store, whereby the address of the initial access to said second control store for each system instruction is manifested by a microinstruction accessed from said first control store.

4. A microprogram control subsystem in accordance with claim 3 wherein:

said second control store is comprised of a plurality of control store modules, each responsive to said addressing means to provide access to a microinstruction;

said gating means of said second control store is comprised of a like plurality of gate elements, each connecting one of said control store modules to said control register;

said selection means includes branch control logic responsive to branch control manifestations in each microinstructions in said control register, and system condition signalling means, for selectively enabling one of said gate elements;

said first interconnecting means includes means for transferring a portion of the binary bits of an operation code, representing the designation of a group of operation codes; and third interconnecting means for transferring the remaining binary bits of the operation code in said operation code register to said branch control logic to thereby enable one of said gate elements to select the second microinstruction for each system instruction execution from one of said control store modules.

* * * * *